(12) United States Patent
Porte et al.

(10) Patent No.: US 8,851,416 B2
(45) Date of Patent: Oct. 7, 2014

(54) AIRCRAFT NACELLE INCLUDING AT LEAST ONE RADIAL PARTITION BETWEEN TWO CONDUCTS

(75) Inventors: Alain Porte, Colomiers (FR); Jacques Lalane, Saint Orens de Garneville (FR); Frederic Chelin, Encausse (FR); Thierry Surply, Cornebarrieu (FR)

(73) Assignee: Airbus Operations (S.A.S.), Toulouse (FR)

( * ) Notice: Subject to any disclaimer, the term of this patent is extended or adjusted under 35 U.S.C. 154(b) by 443 days.

(21) Appl. No.: 13/270,604

(22) Filed: Oct. 11, 2011

(65) Prior Publication Data

US 2012/0090695 A1 Apr. 19, 2012

(30) Foreign Application Priority Data

Oct. 15, 2010 (FR) ...................................... 10 58430

(51) Int. Cl.
*F02C 7/20* (2006.01)
*B64D 33/02* (2006.01)

(52) U.S. Cl.
CPC ........ *B64D 33/02* (2013.01); *B64D 2033/0206* (2013.01); *B64D 2033/0286* (2013.01)
USPC ............................... 244/53 B; 60/796; 60/798

(58) Field of Classification Search
CPC .... F02C 7/04; B64D 33/02; B64D 2033/0286
USPC ............... 244/53 B; 137/15.1, 15.2; 181/214; 60/796–799; 415/200
See application file for complete search history.

(56) References Cited

U.S. PATENT DOCUMENTS

| | | | | |
|---|---|---|---|---|
| 3,319,402 | A * | 5/1967 | Ritchie | 55/306 |
| 3,981,466 | A * | 9/1976 | Shah | 244/134 R |
| 5,885,056 | A * | 3/1999 | Goodwin | 415/9 |
| 6,123,170 | A * | 9/2000 | Porte et al. | 181/214 |
| 7,086,219 | B2 * | 8/2006 | Stretton et al. | 60/226.1 |
| 2002/0023428 | A1 * | 2/2002 | Demay et al. | 60/251 |
| 2004/0007422 | A1 * | 1/2004 | Porte et al. | 181/210 |
| 2004/0094359 | A1 | 5/2004 | Porte et al. | |
| 2005/0252195 | A1 * | 11/2005 | Porte et al. | 60/226.1 |
| 2011/0168839 | A1 | 7/2011 | Porte et al. | |

FOREIGN PATENT DOCUMENTS

| | | |
|---|---|---|
| EP | 1 369 555 A1 | 12/2003 |
| FR | 2 936 223 A1 | 3/2010 |
| FR | 2 940 377 A1 | 6/2010 |

OTHER PUBLICATIONS

French Search Report, dated May 24, 2011, from corresponding French application.

* cited by examiner

*Primary Examiner* — Gerald L Sung
(74) *Attorney, Agent, or Firm* — Young & Thompson

(57) ABSTRACT

An aircraft nacelle that makes it possible to channel a stream of air in a longitudinal direction and that includes at least two panels (50, 50') placed end to end in the longitudinal direction, each including a so-called aerodynamic surface (52, 52') that is in contact with the air stream and an edge (54, 54') that is in contact with the edge of the other panel, characterized in that at least one of the panels includes—at its edge (54, 54')—at least one partition (58) that projects relative to the edge that extends in the direction of the edge of the other panel, in a manner that is secant to the aerodynamic surface and in a plane that contains the longitudinal direction, so as to limit the circulation of air between the edges of the panels.

20 Claims, 3 Drawing Sheets

AIRCRAFT NACELLE INCLUDING AT LEAST ONE RADIAL PARTITION BETWEEN TWO CONDUCTS

BACKGROUND OF THE INVENTION

This invention relates to an aircraft nacelle that incorporates at least one radial partition at the junction zone of two pipes that channel a stream of air.

DESCRIPTION OF THE RELATED ART

An aircraft propulsion system comprises a nacelle in which a power plant is arranged in an essentially concentric manner.

Figure 1:
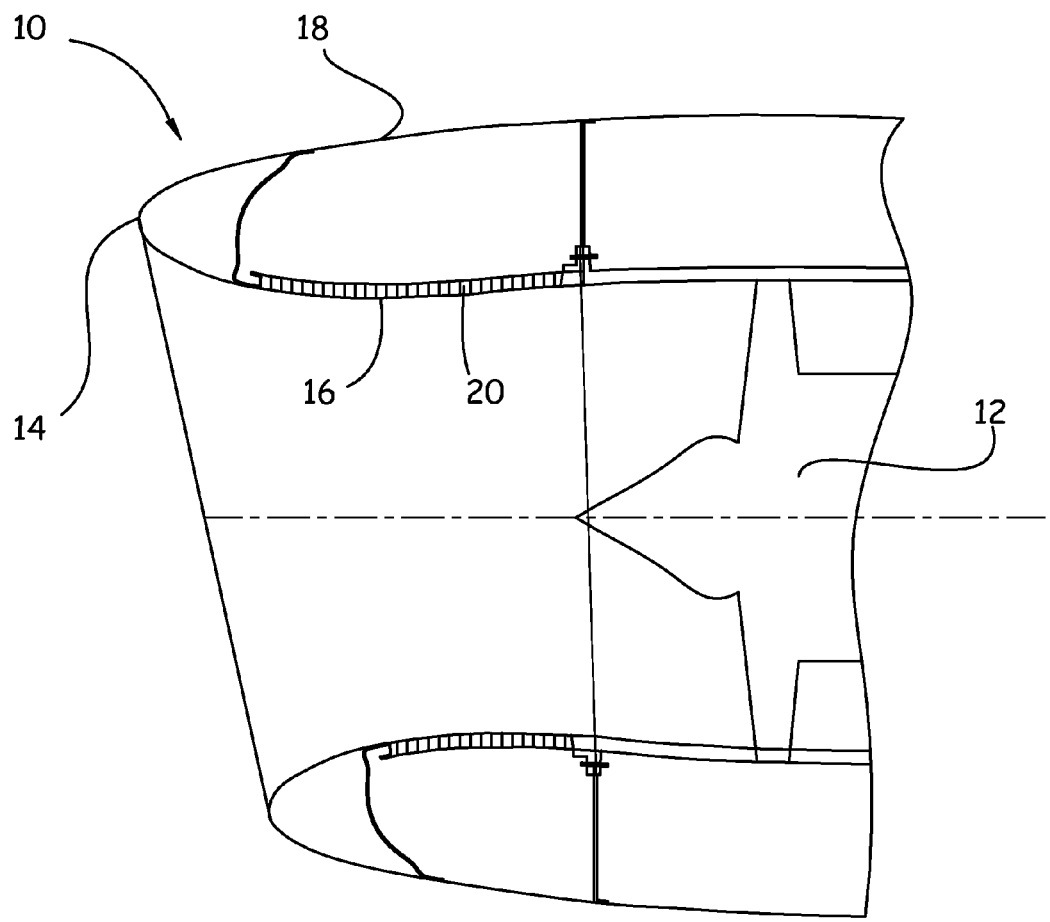

As illustrated in FIG. 1, the nacelle comprises an air intake 10 at the front that makes it possible to channel a stream of air in a power plant 12, with a first part of the incoming air stream, called the primary stream, passing through the power plant to take part in the combustion process, and with the second part of the air stream, called the secondary stream, being entrained by a fan and flowing into an annular pipe that is delimited by the inside wall of the nacelle and the outside wall of the power plant.

The air intake 10 comprises a lip 14 of which the surface that is in contact with the aerodynamic streams is extended inside the nacelle by an inside pipe 16 and outside of the nacelle by an outside wall 18.

Techniques have been developed for reducing the noise emitted by an aircraft and in particular the noise that is emitted by the propulsion systems. They consist in placing a panel 20 whose purpose is to absorb a part of the sound energy, in particular by using the principle of Helmholtz resonators, in particular at the wall of the inside pipe 16.

In a known manner, an acoustic treatment panel 20 comprises—from the outside to the inside—an acoustically resistive porous layer 22, at least one alveolar structure 24, and a reflective or impermeable layer 26.

Figure 3:
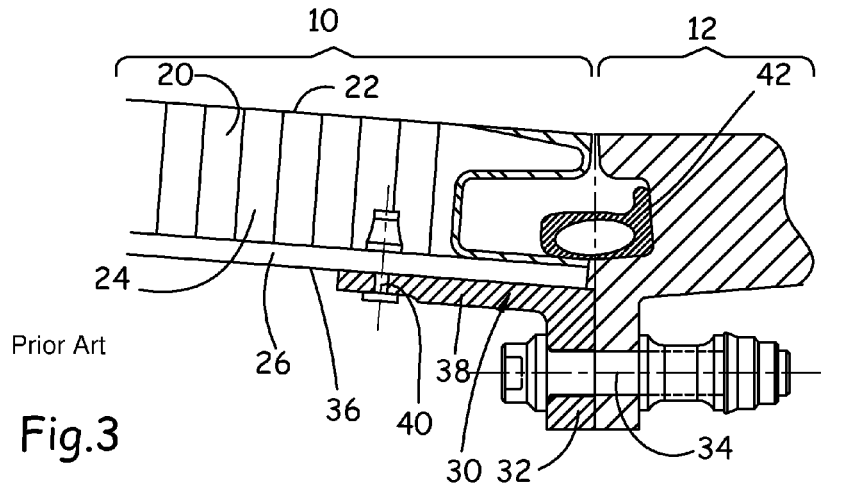

The air intake 10 is connected to the power plant 12 by a connection that is illustrated in detail in FIG. 3. At the power plant, this connection comprises an annular collar 28 with which a flange 30 is made integral. This flange has an L-shaped cross-section of which one wing 32 is flattened against the collar 28 and is made integral with the latter by any suitable means, for example bolts or rivets 34, passing through the collar and the wing 32 of the flange and extending parallel to the longitudinal axis of the nacelle. Preferably, this flange 30 extends over the circumference of the pipe 16 and can be made in several sections. The flange 30 is connected to the air intake 10 and more particularly to the rear surface 36 of the panel 20 for the acoustic treatment that delimits the inside pipe 16.

For this purpose, the second wing 38 of the flange 30 is flattened against the rear surface 36 of the acoustic panel and made integral with the latter by any suitable means, in particular bolts or rivets 40 oriented radially.

Figure 2:
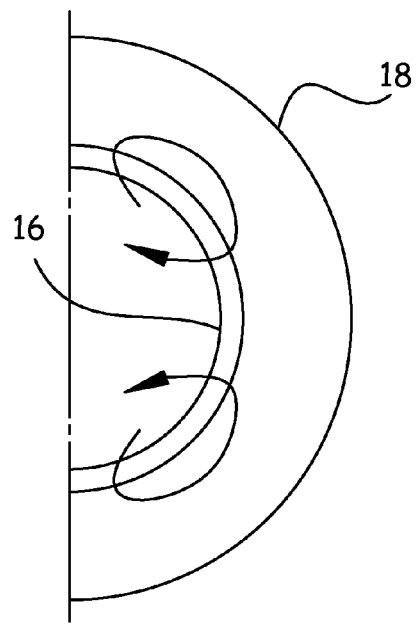

During flight phases, there are pressure gradients in the nacelle at the junction zone between the air intake and the power plant as illustrated in FIG. 1. These pressure gradients can generate parasitic air streams that penetrate behind the inside wall at a first point of the junction zone to emerge at another point of said zone, as illustrated in FIG. 2. These parasitic air streams generate disturbances at the secondary air stream that degrade the aerodynamic performances of the power plant.

To limit the appearance of these parasitic air streams, one approach consists in inserting a joint 42 (visible in FIG. 3), which extends over the entire periphery of the air intake, between the air intake and the power plant.

This annular joint 42 costs a significant amount. In addition, for large nacelle diameters, the joint can have a length on the order of 9 m, which tends to increase the on-board weight.

SUMMARY OF THE INVENTION

The purpose of this invention is to propose a simple alternative approach, equally effective and which limits the increase of the on-board weight relative to the approaches of the prior art.

For this purpose, the invention has as its object an aircraft nacelle that makes it possible to channel a stream of air in a longitudinal direction and that comprises at least two panels placed end to end in the longitudinal direction, each comprising a so-called aerodynamic surface that is in contact with the air stream and an edge that is in contact with the edge of the other panel, characterized in that at least one of the panels comprises—at its edge—at least one partition that projects relative to said edge that extends in the direction of the edge of the other panel, in a manner that is secant to the aerodynamic surface and in a plane that contains the longitudinal direction, so as to limit the circulation of air between the edges of the panels.

BRIEF DESCRIPTION OF THE DRAWINGS FIGURES

Figure 4A:
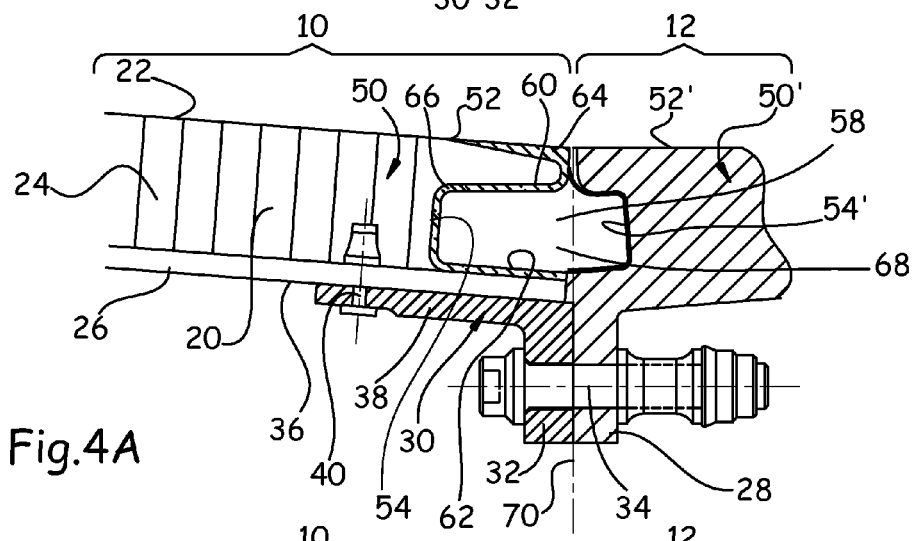
Figure 4B:
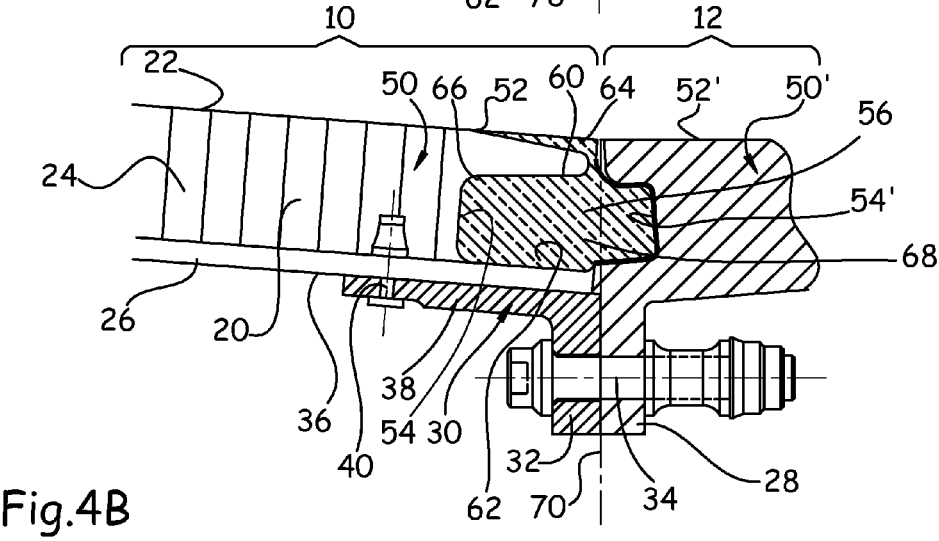
Figure 5A:
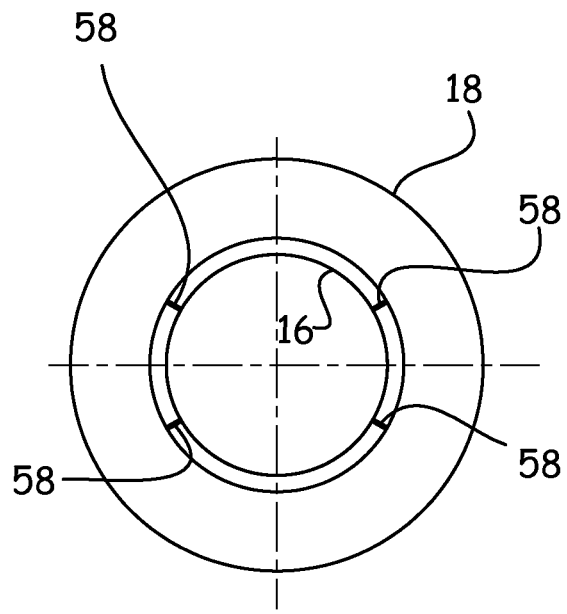
Figure 5B:
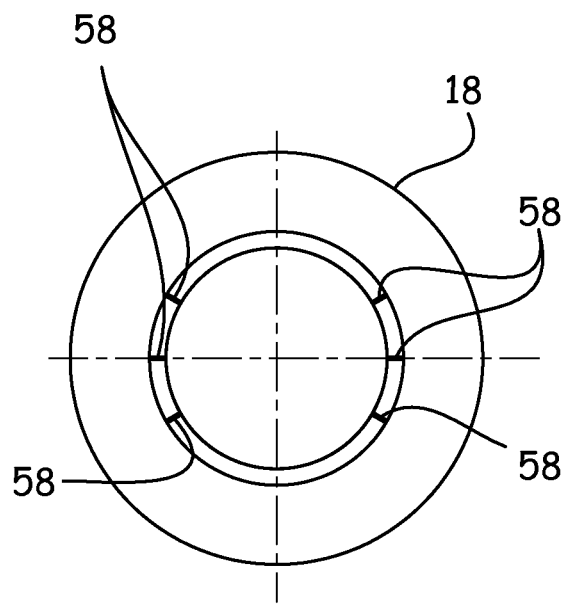

Other characteristics and advantages will emerge from the following description of the invention, a description that is provided only by way of example, relative to the accompanying drawings, in which:

FIG. 1 is a cutaway along a longitudinal and vertical plane of the front of an aircraft nacelle, FIG. 2 is a transverse cutaway at a junction zone between two pipes illustrating the risks of parasitic streams according to the prior art, FIG. 3 is a cutaway along a longitudinal and vertical plane that illustrates in detail the interface between two pipes according to the prior art, FIG. 4A is a cutaway along a longitudinal and vertical plane that illustrates in detail the interface between two pipes according to the invention, FIG. 4B is a cutaway along a longitudinal plane that contains a partition that illustrates in detail the interface between two pipes according to the invention, and FIGS. 5A and 5B are diagrams that illustrate partitions that make it possible to limit the recirculation of air according to different configurations of the invention.

DETAILED DESCRIPTION OF THE INVENTION

FIGS. 4A and 4B show the junction zone in detail between the inside pipe 16 of the air intake of an aircraft nacelle and the pipe of the power plant 12. These pipes are delimited by thick walls, with a thickness that is greater than or equal to 30 mm.

These pipes can consist of a single piece that extends over their entire circumference or several angular sectors that are assembled in an adequate manner. The assembly of these two pipes with one another is not presented in more detail because it is known to one skilled in the art.

According to one embodiment, the inside pipe can be delimited by an acoustic treatment panel 20 that comprises—from the outside to the inside—an acoustically resistive porous layer 22, at least one alveolar structure 24, and a reflective or impermeable layer 26.

In the same manner, the pipe of the power plant can also be delimited by an acoustic treatment panel and/or by a protective panel that makes it possible, i.a., to absorb a part of the energy in the event that the power plant fan's blades break.

Although applied to the junction zone between the inside pipe and the pipe of the power plant, the invention is in no way limited to this zone and can be applied to all of the junction zones between two panels of an aircraft nacelle placed end to end in the direction of flow of a stream of air, also called longitudinal direction. Thus, as illustrated in FIGS. 4A and 4B, each panel 50, 50' comprises a so-called aerodynamic surface 52, 52' that is in contact with the stream of air and a surface 54, 54' that is called an edge and that is able to be in contact with the edge of the other panel.

When the two edges 54, 54' are brought into contact, they can delimit between them a cavity 56 that, in the case of two pipes placed end to end, can be annular and extend over the entire circumference.

According to the invention, at least one of the panels comprises—at its edge 54, 54'—at least one partition 58 that projects relative to said edge that extends in the direction of the edge of the other panel, in a manner that is secant to the aerodynamic surface so as to limit the circulation of air between the edges of the panels. Partition is defined as a wall whose thickness is significantly less relative to the other dimensions of the surfaces of said wall.

The presence of at least one partition that extends through and between the edges makes it possible to limit the appearance of parasitic streams while limiting the on-board weight, taking into account the fact that the partitions are point elements that do not extend over the entire circumference of the pipe in the manner of an annular joint of the prior art.

In the case of pressure gradients that vary along the edges of the panels, said at least one partition is preferably arranged at the largest gradients.

In the case of the inside pipe of an air intake, the acoustic treatment panel 20 comprises—at the edge 54—a structural reinforcement 60 that extends over the circumference of the pipe 16 and that is made in at least one section.

This structural reinforcement 60 is flattened against the reflective layer 26 and placed in the extension of the acoustically resistive porous layer 22 and the alveolar structure 24. This structural reinforcement 60 has, along a radial plane, a Z-shaped cross-section, with a first part 62 flattened against the reflective layer 26, a second part 64 that is in contact with the aerodynamic streams ensuring the extension between the inside pipe 16 of the air intake and the pipe of the power plant 12, and a third so-called intermediate part 66 that connects the parts 62 and 64 that delimit a release 68.

This release 68 generates an annular cavity between the two pipes.

According to an embodiment that is illustrated in FIGS. 4A and 4B, the edge 54' of the pipe of the power plant can also have a C shape. In this case, the annular cavity can extend on either side of the junction surface 70 indicated by dashes in FIGS. 4A and 4B.

According to the invention, at least one partition 58 extends across the annular cavity in such a way as to limit the appearance of parasitic air streams between the edges 54, 54' of the pipes. The partition(s) 58 equally are connected to the inside pipe 16 of the air intake or to the pipe of the power plant.

Preferably, the partitions are arranged radially, namely in planes that contain the longitudinal direction.

According to one embodiment, the partition(s) 58 are connected to the inside pipe 16 and more particularly to the structural reinforcement 60. As a variant, they can be connected to the power plant 12.

The partitions are preferably arranged symmetrically relative to the vertical longitudinal plane.

According to a first arrangement that is illustrated in FIG. 5A, the junction zone comprises four partitions 58 that are arranged at 45°, 135°, 225°, and 315°, the origin corresponding to the top part of the pipe.

According to a second arrangement that is illustrated in FIG. 5B, the junction zone comprises six partitions 58 that are arranged at 45°, 90°, 135°, 225°, 270° and 315°.

Advantageously, the partitions 58 are arranged in the zones where the pressure gradients are the largest, namely on either side of the horizontal longitudinal plane.

According to the variants, the partition(s) 58 can be metal and/or made of composite material.

The invention claimed is:

1. An aircraft nacelle that channels a stream of air in a longitudinal direction, said nacelle comprising:
    two panels (50, 50') placed end to end in the longitudinal direction, the two panels (50, 50') including a vertical longitudinal plane, each panel comprising an exterior aerodynamic surface (52, 52') that contacts the air stream and an end edge (54, 54'),
    a first of the panels (50) including an outside pipe (18) at an exterior aerodynamic surface (52, 52') and an inside pipe (16), the end edge (54, 54') of the first panel extending between the outside pipe (18) and the inside pipe (16),
    the end edge (54) of the first panel (50) contacting the end edge (54') of a second of the panels (50') and delimiting an annular release (68) therebetween; and
    plural spaced-apart partitions (58), each partition (58) being arranged radially in planes that contain the longitudinal direction and having a wall with a length that extend in the longitudinal direction across the release (68) from the end edge of the first panel to the end edge of the second panel, and a height extending between the outside pipe (18) and the inside pipe (16) of the first panel, with a thickness of the wall being less than the height of the wall, the partitions limiting circulation of air within the release (68).

2. The aircraft nacelle according to claim 1, with said nacelle comprising pressure gradients that vary along edges of the panels, wherein said partitions (58) are arranged at the largest gradients.

3. The aircraft nacelle according to claim 1, wherein the first panel defines an air intake.

4. The aircraft nacelle according to claim 3, wherein said partitions (58) are arranged radially in planes that contain the longitudinal direction.

5. The aircraft nacelle according to claim 3, wherein said partitions (58) are arranged in a radially symmetrical manner relative to the vertical longitudinal plane.

6. The aircraft nacelle according to claim 5, comprising four of said partitions (58), said four partitions (58) being arranged at 45°, 135°, 225°, and 315°, with respect to an origin corresponding to a top part of the two panels.

7. The aircraft nacelle according to claim 5, comprising six of said partitions (58), said six partitions (58) arranged at 45°, 90°, 135°, 225°, 270°, and 315°, with respect to an origin corresponding to a top part of the two panels.

8. The aircraft nacelle according claim 2, wherein the first panel defines an air intake.

9. The aircraft nacelle according to claim 8, wherein said partitions (58) are arranged radially in planes that contain the longitudinal direction.

10. The aircraft nacelle according to claim 4, wherein said partitions (58) are arranged in a radially symmetrical manner relative to the vertical longitudinal plane.

11. The aircraft nacelle according to claim 10, comprising four of said partitions (58), said four partitions (58) being arranged at 45°, 135°, 225°, and 315°, with respect to an origin corresponding to a top part of the two panels.

12. The aircraft nacelle according to claim 10, comprising six of said partitions (58), said six partitions (58) arranged at 45°, 90°, 135°, 225°, 270°, and 315°, with respect to an origin corresponding to a top part of the two panels.

13. The aircraft nacelle according to claim 1, wherein said release (68) defines an annular cavity, delimited between the end edge (54) of the first panel (50) and the end edge (54') of the second panel (50'), free of any annular filling ring (42) between said partitions (58).

14. An aircraft nacelle that channels a stream of air in a longitudinal direction, said nacelle comprising:
    two panels (50, 50') placed end to end in the longitudinal direction, the two panels (50, 50') including a vertical longitudinal plane, each panel comprising an exterior aerodynamic surface (52, 52') that contacts the air stream and an end edge (54, 54'),
    a first of the panels (50) defining an air intake and including an outside pipe (18) at an exterior aerodynamic surface (52, 52') and an inside pipe (16), the end edge (54, 54') of the first panel extending between the outside pipe (18) and the inside pipe (16),
    the end edge (54) of the first panel (50) contacting the end edge (54') of a second of the panels (50') and delimiting an annular release (68) therebetween;
    at least one partition (58) with i) a length that extends in the longitudinal direction across the release (68) from the end edge of the first panel to the end edge of the second panel, ii) a height extending between the outside pipe (18) and the inside pipe (16) of the first panel, and iii) a thickness of the wall being less than the height of the wall,
    the at least one partition (58) being arranged radially in planes that contain the longitudinal direction and limiting circulation of air within the release (68).

15. The aircraft nacelle according to claim 14, wherein plural of said at least one partition (58) are arranged radially in a symmetrical manner relative to the vertical longitudinal plane.

16. The aircraft nacelle according to claim 15, comprising four of said partitions (58), said four partitions (58) being arranged at 45°, 135°, 225°, and 315°, with respect to an origin corresponding to a top part of the two panels.

17. The aircraft nacelle according to claim 15, comprising six of said partitions (58), said six partitions (58) arranged at 45°, 90°, 135°, 225°, 270°, and 315°, with respect to an origin corresponding to a top part of the two panels.

18. The aircraft nacelle according to claim 13,
    wherein plural of said at least one partition (58) are arranged in a symmetrical manner, and
    wherein said release (68) defines an annular cavity, delimited between the end edge (54) of the first panel (50) and the end edge (54') of the second panel (50'), free of any annular filling ring (42) between said partitions (58).

19. The aircraft nacelle according to claim 15, wherein said release (68) defines an annular cavity, delimited between the end edge (54) of the first panel (50) and the end edge (54') of the second panel (50'), free of any annular filling ring (42) between said partitions (58).

20. The aircraft nacelle according to claim 16, wherein said release (68) defines an annular cavity, delimited between the end edge (54) of the first panel (50) and the end edge (54') of the second panel (50'), free of any annular filling ring (42) between said partitions (58).

* * * * *